(12) United States Patent
Peterson et al.

(10) Patent No.: US 11,661,521 B2
(45) Date of Patent: May 30, 2023

(54) THREE-DIMENSIONAL PRINTING SYSTEM EMPLOYING A THERMOTROPIC LIQUID CRYSTALLINE POLYMER

(71) Applicant: Ticona LLC, Florence, KY (US)

(72) Inventors: Craig J. Peterson, Hebron, KY (US); Xinyu Zhao, Cincinnati, OH (US); Young Shin Kim, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 59 days.

(21) Appl. No.: 17/120,365

(22) Filed: Dec. 14, 2020

(65) Prior Publication Data

US 2021/0179870 A1 Jun. 17, 2021

Related U.S. Application Data

(60) Provisional application No. 62/948,877, filed on Dec. 17, 2019.

(51) Int. Cl.
| | | |
|---|---|---|
| *C09D 11/104* | (2014.01) | |
| *B29C 64/118* | (2017.01) | |
| *B29C 64/153* | (2017.01) | |
| *B29C 64/259* | (2017.01) | |
| *B33Y 70/00* | (2020.01) | |
| *B33Y 10/00* | (2015.01) | |

(Continued)

(52) U.S. Cl.
CPC .......... *C09D 11/104* (2013.01); *B29C 64/118* (2017.08); *B29C 64/153* (2017.08); *B29C 64/259* (2017.08); *B33Y 70/00* (2014.12); *B29K 2105/0079* (2013.01); *B33Y 10/00* (2014.12); *B33Y 30/00* (2014.12)

(58) Field of Classification Search
CPC ... B29C 64/118; B29C 64/153; B29C 64/259; B29K 2105/0079; B33Y 10/00; B33Y 30/00; B33Y 70/00
See application file for complete search history.

(56) References Cited

U.S. PATENT DOCUMENTS

| | | |
|---|---|---|
| 4,161,470 A | 7/1979 | Calundann |
| 4,863,538 A | 9/1989 | Deckard |

(Continued)

FOREIGN PATENT DOCUMENTS

| | | |
|---|---|---|
| CN | 103980445 A | 8/2014 |
| CN | 103980595 A | 8/2014 |

(Continued)

OTHER PUBLICATIONS

First International PEEK Meeting Program, Apr. 25-26, 2013, Philadelphia, PA, 72 pages.

(Continued)

*Primary Examiner* — Yunju Kim
(74) *Attorney, Agent, or Firm* — Dority & Manning, P.A.

(57) ABSTRACT

A three-dimensional printing method is provided. The method comprises selectively forming a three-dimensional structure from a polymer composition. The polymer composition comprises a thermotropic liquid crystalline polymer and exhibits a complex viscosity of from about 50 to about 1,000 Pa-s, as determined by a parallel plate rheometer at an angular frequency of 0.63 radians per second, constant strain amplitude of 1%, and temperature 15° C. above the melting temperature of the polymer composition.

23 Claims, 5 Drawing Sheets

(51) Int. Cl.
B33Y 30/00 (2015.01)
B29K 105/00 (2006.01)

(56) References Cited

U.S. PATENT DOCUMENTS

| | | | |
|---|---|---|---|
| 5,132,143 A | 7/1992 | Deckard | |
| 5,204,055 A | 4/1993 | Sachs et al. | |
| 5,503,785 A | 4/1996 | Crump et al. | |
| 5,616,680 A | 4/1997 | Linstid, III | |
| 5,764,521 A | 6/1998 | Batchelder et al. | |
| 6,004,124 A | 12/1999 | Swanson et al. | |
| 6,070,107 A | 5/2000 | Lombardi et al. | |
| 6,114,492 A | 9/2000 | Linstid, III et al. | |
| 6,228,923 B1 | 5/2001 | Lombardi et al. | |
| 6,514,611 B1 | 2/2003 | Shepherd et al. | |
| 6,790,403 B1 | 9/2004 | Priedeman, Jr. et al. | |
| 6,923,634 B2 | 8/2005 | Swanson et al. | |
| 7,122,246 B2 | 10/2006 | Comb et al. | |
| 7,569,273 B2 | 8/2009 | Bredt et al. | |
| 7,604,470 B2 | 10/2009 | LaBossiee et al. | |
| 7,625,200 B2 | 12/2009 | Leavitt | |
| 7,754,807 B2 | 7/2010 | Priedeman, Jr. et al. | |
| 7,891,964 B2 | 2/2011 | Stubic et al. | |
| 8,221,858 B2 | 7/2012 | Mannella et al. | |
| 8,618,239 B2 | 12/2013 | Gray et al. | |
| 8,646,994 B2 | 2/2014 | Kim et al. | |
| 8,669,341 B2 | 3/2014 | Nair et al. | |
| 8,822,628 B2 | 9/2014 | Nair et al. | |
| 8,852,730 B2 | 10/2014 | Nair et al. | |
| 8,853,342 B2 | 10/2014 | Nair | |
| 8,853,344 B2 | 10/2014 | Kim et al. | |
| 8,906,258 B2 | 12/2014 | Gray et al. | |
| 8,906,259 B2 | 12/2014 | Kim | |
| 8,926,862 B2 | 1/2015 | Kim et al. | |
| 8,932,483 B2 | 1/2015 | Kim | |
| 8,955,558 B2 | 2/2015 | Bosveld et al. | |
| 9,045,685 B2 | 6/2015 | Nair et al. | |
| 9,051,514 B2 | 6/2015 | Nair et al. | |
| 9,057,016 B2 | 6/2015 | Nair et al. | |
| 9,074,070 B2 | 7/2015 | Yung et al. | |
| 9,074,133 B2 | 7/2015 | Nair et al. | |
| 9,090,751 B2 | 7/2015 | Saga et al. | |
| 9,096,794 B2 | 8/2015 | Nair et al. | |
| 9,102,792 B2 | 8/2015 | Nair et al. | |
| 9,145,519 B2 | 9/2015 | Nair | |
| 9,151,416 B2 | 10/2015 | Feng et al. | |
| 9,206,300 B2 | 12/2015 | Zhao et al. | |
| 9,234,091 B2 | 1/2016 | Tyler et al. | |
| 9,284,435 B2 | 3/2016 | Kim | |
| 9,340,656 B2 | 5/2016 | Muholland | |
| 9,353,263 B2 | 5/2016 | Kim et al. | |
| 9,355,753 B2 | 5/2016 | Kim | |
| 9,512,293 B2 | 12/2016 | Kim | |
| 9,592,530 B2 | 3/2017 | Rodgers | |
| 9,744,722 B2 | 8/2017 | Roders | |
| 9,822,254 B2 | 11/2017 | Kim | |
| 9,895,842 B2 | 2/2018 | Pfister et al. | |
| 9,988,519 B2 | 6/2018 | Kim | |
| 10,023,716 B2 | 7/2018 | Mulholland | |
| 10,106,682 B2 | 10/2018 | Kim | |
| 10,156,303 B2 | 12/2018 | Feng et al. | |
| 10,186,344 B2 | 1/2019 | Prestayko et al. | |
| 10,280,282 B2 | 5/2019 | Kim | |
| 10,358,556 B2 | 7/2019 | Luo et al. | |
| 10,485,902 B2 | 11/2019 | Kepler et al. | |
| 10,501,869 B2 | 12/2019 | Van Der Schaaf et al. | |
| 10,519,356 B2 | 12/2019 | Chua et al. | |
| 10,640,648 B2 | 5/2020 | Kim | |
| 10,744,215 B2 | 8/2020 | LaPorte et al. | |
| 10,767,049 B2 | 9/2020 | Kim | |
| 10,808,077 B2 | 10/2020 | Jeol et al. | |
| 10,941,275 B2 | 3/2021 | Kim | |
| 10,954,379 B2 | 3/2021 | Chaplin et al. | |
| 10,968,539 B2 | 4/2021 | Wetzel et al. | |
| 11,086,200 B2 | 8/2021 | Kim | |
| 11,148,409 B2 | 10/2021 | Mark et al. | |
| 11,155,031 B2 | 10/2021 | Chapiro et al. | |
| 2004/0135118 A1 | 7/2004 | Waggoner | |
| 2008/0319247 A1 | 12/2008 | Forbes et al. | |
| 2013/0320598 A1 | 12/2013 | Atkins et al. | |
| 2014/0120282 A1* | 5/2014 | Kim | B29C 45/16 428/212 |
| 2014/0134419 A1* | 5/2014 | Kim | C09K 19/38 525/437 |
| 2016/0024293 A1 | 1/2016 | Nestle et al. | |
| 2016/0160073 A1 | 6/2016 | Roberson et al. | |
| 2016/0297104 A1 | 10/2016 | Guillemette et al. | |
| 2017/0189960 A1* | 7/2017 | Ibe | B22F 1/052 |
| 2017/0218245 A1 | 8/2017 | Chabanne et al. | |
| 2018/0065294 A1* | 3/2018 | Yamashita | C08G 63/127 |
| 2018/0264688 A1 | 9/2018 | Jaker et al. | |
| 2018/0305577 A1 | 10/2018 | Bheda et al. | |
| 2018/0361558 A1 | 12/2018 | Gaggar et al. | |
| 2018/0361656 A1 | 12/2018 | Powale et al. | |
| 2018/0361657 A1 | 12/2018 | Powale et al. | |
| 2018/0361658 A1 | 12/2018 | Gaggar et al. | |
| 2019/0062577 A1 | 2/2019 | Zoetelief et al. | |
| 2019/0134972 A1 | 5/2019 | Kerrigan | |
| 2019/0358900 A1 | 11/2019 | Davis et al. | |
| 2020/0009785 A1 | 1/2020 | Jeol et al. | |
| 2020/0123316 A1 | 4/2020 | Jeol et al. | |
| 2020/0156283 A1 | 5/2020 | Kopping et al. | |
| 2020/0254695 A1 | 8/2020 | Mastroianni et al. | |
| 2020/0255660 A1 | 8/2020 | Durand et al. | |
| 2020/0269496 A1 | 8/2020 | Jeol et al. | |
| 2020/0269497 A1 | 8/2020 | Jeol et al. | |
| 2020/0276760 A1 | 9/2020 | Spahr et al. | |
| 2020/0395149 A1 | 12/2020 | Son et al. | |
| 2021/0016494 A1 | 1/2021 | Jeol et al. | |
| 2021/0060851 A1 | 3/2021 | Nakai et al. | |
| 2021/0179846 A1 | 6/2021 | Peterson et al. | |
| 2021/0206051 A1 | 7/2021 | Peterson et al. | |

FOREIGN PATENT DOCUMENTS

| | | |
|---|---|---|
| CN | 104163634 A | 11/2014 |
| CN | 104177551 A | 12/2014 |
| CN | 104650587 A | 5/2015 |
| CN | 105504662 A | 4/2016 |
| CN | 105504813 A | 4/2016 |
| CN | 106280457 A | 1/2017 |
| CN | 106317579 A | 1/2017 |
| CN | 106334215 A | 1/2017 |
| CN | 206106418 U | 4/2017 |
| CN | 106700411 A | 5/2017 |
| CN | 106750300 A | 5/2017 |
| CN | 106832838 A | 6/2017 |
| CN | 107022167 A | 8/2017 |
| CN | 107141797 A | 9/2017 |
| CN | 107141798 A | 9/2017 |
| CN | 107141799 A | 9/2017 |
| CN | 107163577 A | 9/2017 |
| CN | 107312331 A | 11/2017 |
| CN | 107312332 A | 11/2017 |
| CN | 107353644 A | 11/2017 |
| CN | 107501934 A | 12/2017 |
| CN | 206856024 U | 1/2018 |
| CN | 107674282 A | 2/2018 |
| CN | 107674419 A | 2/2018 |
| CN | 107698973 A | 2/2018 |
| CN | 108035144 A | 5/2018 |
| CN | 108117744 A | 6/2018 |
| CN | 108424605 A | 8/2018 |
| CN | 108752918 A | 11/2018 |
| CN | 109093109 A | 12/2018 |
| CN | 109094015 A | 12/2018 |
| CN | 109181199 A | 1/2019 |
| CN | 109203450 A | 1/2019 |
| CN | 109276760 A | 1/2019 |
| CN | 109467744 A | 3/2019 |
| GB | 2566934 A | 4/2019 |
| WO | WO 2016/080573 A1 | 5/2016 |
| WO | WO 2017/100447 A1 | 6/2017 |
| WO | WO 2018/146281 A1 | 8/2018 |

(56) References Cited

FOREIGN PATENT DOCUMENTS

| WO | WO 2018/197157 A1 | 11/2018 |
| WO | WO 2019/000965 A1 | 1/2019 |
| WO | WO 2019/000966 A1 | 1/2019 |
| WO | WO 2019/053238 A1 | 3/2019 |
| WO | WO 2019/063740 A1 | 4/2019 |
| WO | WO 2019/099031 A1 | 5/2019 |

OTHER PUBLICATIONS $2^{nd}$ International PEEK Meeting Program, Apr. 23-24, 2015, Washington DC, 40 pages.
$3^{rd}$ International PEEK Meeting Program, Apr. 27-28, 2017, Washington DC, 64 pages.
$4^{th}$ International PEEK Meeting Program, Apr. 25-26, 2019, Washington DC, 68 pages.
ASTM F2792-12a, "Standard Terminology for Additive Manufacturing Technologies," *ATM International*, Mar. 2012 (original approved in 2009), 3 pages.
DiPrima, Matthew, PhD., "Update on Regulating 3D-Printed Medical Products," *US Food and Drug Administration, $4^{th}$ International Peek Meeting*, Apr. 15, 2019, 23 pages.
Ghita, Oana, "Laser sintered Peek intervertebral lumbar sages: process and properties," University of Exeter, Centre for Additive Layer Manufacturing, $4^{th}$ *International Peek Meeting*, 13 pages.
Poster—Law et al., "Design for Porous PEEK Topologies Using Fused Filament Fabrication," *PEEK-Meeting-PPT-AL*, 4 pages.
Prabhu, Balaji, et al., Next Generation VESTAKEEP® PEEK, *Peek Meeting*, Washington DC, Apr. 25, 2019, 19 pages.
Related Applications Form.
International Search Report and Written Opinion for PCT/US2020/064799 dated May 26, 2021, 11 pages.

\* cited by examiner

THREE-DIMENSIONAL PRINTING SYSTEM EMPLOYING A THERMOTROPIC LIQUID CRYSTALLINE POLYMER

RELATED APPLICATION

The present application claims priority to U.S. Provisional Application Ser. No. 62/948,877, filed on Dec. 17, 2019, which is incorporated herein in its entirety by reference thereto.

BACKGROUND OF THE INVENTION

Additive manufacturing, also called three-dimensional or 3D printing, is generally a process in which a three-dimensional structure is selectively formed from a digital model. Various types of three-dimensional printing techniques may be employed, such as fused deposition modeling, ink jetting, powder bed fusion (e.g., selective laser sintering), powder/binder jetting, electron-beam melting, electrophotographic imaging, and so forth. In a fused deposition modeling system, for instance, a build material may be extruded through an extrusion tip carried by a print nozzle of the system, and then deposited as a sequence of layers on a substrate. The extruded material fuses to previously deposited material, and solidifies upon a drop in temperature. The position of the print nozzle relative to the substrate may be incremented along an axis (perpendicular to the build plane) after each layer is formed, and the process may then be repeated to form a printed part resembling the digital representation. If desired, supporting layers or structures can also be built underneath overhanging portions or in cavities of printed parts under construction, which are not supported by the build material itself. The support structure adheres to the part material during fabrication, and is removable from the completed printed part when the printing process is complete. Regardless of the particular technique, three-dimensional printing has been more commonly employed to form plastic parts. Unfortunately, its use has still been somewhat limited in advanced product applications that require a higher level of material performance, such as high thermal stability and heat resistance, enhanced flow, and good mechanical properties. One reason for this limitation is that the polymeric materials commonly employed in three-dimensional printing systems, such as polylactic acid and polyethylene, generally lack high performance properties. Conversely, attempts at employing high performance polymers have often failed as such polymers tend to lack the requisite melt strength and stability required for three-dimensional printing.

As such, a need exists for a high performance polymer composition that can be readily employed in a three-dimensional printing system.

SUMMARY OF THE INVENTION

In accordance with one embodiment of the present invention, a three-dimensional printing method is disclosed that comprises selectively forming a three-dimensional structure from a polymer composition. The polymer composition comprises a thermotropic liquid crystalline polymer and exhibits a complex viscosity of from about 50 to about 1,000 Pa-s, as determined by a parallel plate rheometer at an angular frequency of 0.63 radians per second, constant strain amplitude of 1%, and temperature 15° C. above the melting temperature of the polymer composition.

In accordance with another embodiment of the present invention, a printer cartridge for use in a three-dimensional printing system is disclosed that comprises a filament that is formed from a polymer composition, such as described above. In accordance with yet another embodiment of the present invention, a three-dimensional printing system is disclosed that comprises a supply source containing a polymer composition, such as described above, and a nozzle that is configured to receive the polymer composition from the supply source and deposit the composition onto a substrate. In accordance with still another embodiment of the present invention, a three-dimensional printing system is disclosed that comprises a powder supply comprising a plurality of particles formed from a polymer composition, such as described above; a powder bed configured to receive the powder supply; and an energy source for selectively fusing the powder supply when present within the powder bed.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
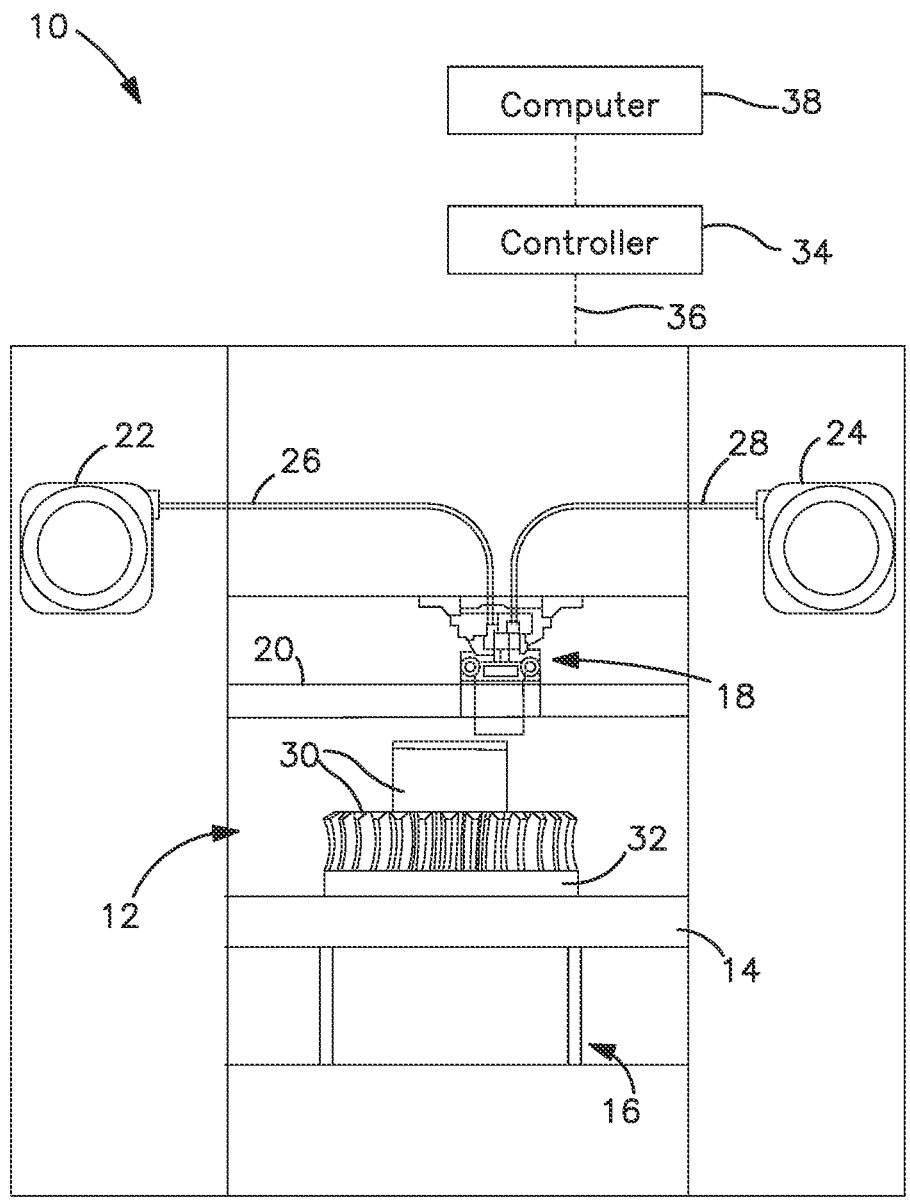
FIG. 1 is a front view of one embodiment of a fused deposition modeling system that may be employed in the present invention.

It is to be understood by one of ordinary skill in the art that the present discussion is a description of exemplary embodiments only, and is not intended as limiting the broader aspects of the present invention.

Generally speaking, the present invention is directed to a three-dimensional printing system and method that employs a polymer composition that contains a thermotropic liquid crystalline polymer. By selectively controlling the specific nature of the liquid crystalline polymer and other aspects of the composition, the present inventors have discovered that the resulting composition can achieve certain unique properties that enable the composition to be readily employed in a three-dimensional printing system. More particularly, the composition may exhibit a high degree of melt strength, which facilitates its ability to be three-dimensionally printed without losing its physical integrity. This high degree of melt strength may be characterized by a relatively high complex viscosity, such as from about about 50 to about 1,000 Pa-s, in some embodiments from about 60 to about 800 Pa-s, and in some embodiments, from about 80 to about 600 Pa-s, as determined at an angular frequency of 0.63 radians per second, temperature of 15° C. above the melting temperature of the composition, and constant strain amplitude of 1%. The melt strength of the polymer composition may also be characterized by its engineering stress. As explained in more detail below, such testing may be performed in accordance with the ARES-EVF during which an extensional viscosity fixture ("EVF") is used on a rotational rheometer to allow the measurement of the material stress versus percent strain. In this regard, the polymer composition can have a relatively high maximum engineering stress even at relatively high percent strains. For example, the composition can exhibit its maximum engineering stress at a percent strain of from about 0.3% to about 1.5%, in some embodiments from about 0.4% to about 1.5%, and in some embodiments, from about 0.6% to about 1.2%. The maximum engineering stress may, for instance, range from about 340 kPa to about 600 kPa, in some embodiments from about 350 kPa to about 500 kPa, and in some embodiments, from about 370 kPa to about 420 kPa. Just as an example, at a percent strain of about 0.6%, the composition can exhibit a relatively high engineering stress of 340 kPa to about 600 kPa, in some embodiments from about 350 kPa to about 500 kPa, and in some embodiments, from about 360 kPa to about 400 kPa. The elongational viscosity may also range from about 350 kPa-s to about 1500 kPa-s, in some embodiments from about 500 kPa-s to about 1000 kPa-s, and in some embodiments, from about 600 kPa-s to about 900 kPa-s.

Despite having a relatively high degree of melt strength, the polymer composition may nevertheless still possess a low melt viscosity at high shear rates. For example, the polymer composition may exhibit a melt viscosity of about 250 Pa-s or less, in some embodiments about 200 Pa-s or less, in some embodiments from about 0.5 to about 150 Pa-s, and in some embodiments, from about 1 to about 100 Pa-s, as determined in accordance with ISO Test No. 11443:2005 at a shear rate of 1,000 s$^{-1}$ and temperature 15° C. above the melting temperature of the composition.

Conventionally, it was believed that polymer compositions that possesses a high degree of melt strength and good flow properties would not also possess sufficiently good thermal and mechanical properties to enable their use in three-dimensional printing systems. Contrary to conventional thought, however, the polymer composition may possess both excellent thermal and mechanical properties. The melting temperature of the composition may, for instance, generally range from about 200° C. to about 400° C., in some embodiments from about 210° C. to about 400° C., and in some embodiments, from about 250° C. to about 380° C. The melting temperature may be determined as is well known in the art using differential scanning calorimetry ("DSC"), such as determined by ISO Test No. 11357-3:2011. In certain cases, the polymer composition may have a relatively low melting temperature to help with processability during three-dimensional printing, such as from about 200° C. to about 300° C., and in some embodiments, from about 210° C. to about 290° C. Of course, in other embodiments, the polymer composition may have a relatively high melting temperature, such as from about 300° C. to about 400° C., and in some embodiments, from about 310° C. to about 380° C.

Even at the melting temperatures noted above, the ratio of the deflection temperature under load ("DTUL"), a measure of short term heat resistance, to the melting temperature may still remain relatively high. For example, the ratio may range from about 0.5 to about 1.00, in some embodiments from about 0.6 to about 0.95, and in some embodiments, from about 0.65 to about 0.85. The specific DTUL values may, for instance, range from about 200° C. to about 350° C., in some embodiments from about 210° C. to about 320° C., and in some embodiments, from about 230° C. to about 290° C.

The polymer composition may also possess good tensile and flexural mechanical properties. For example, the polymer composition may exhibit a tensile strength of from about 20 to about 500 MPa, in some embodiments from about 50 to about 400 MPa, and in some embodiments, from about 70 to about 350 MPa; a tensile break strain of about 0.4% or more, in some embodiments from about 0.5% to about 10%, and in some embodiments, from about 0.6% to about 3.5%; and/or a tensile modulus of from about 5,000 MPa to about 20,000 MPa, in some embodiments from about 8,000 MPa to about 20,000 MPa, and in some embodiments, from about 10,000 MPa to about 20,000 MPa. The tensile properties may be determined at a temperature of 23° C. in accordance with ISO Test No. 527:2012. The polymer composition may also exhibit a flexural strength of from about 20 to about 500 MPa, in some embodiments from about 50 to about 400 MPa, and in some embodiments, from about 100 to about 350 MPa; a flexural elongation of about 0.4% or more, in some embodiments from about 0.5% to about 10%, and in some embodiments, from about 0.6% to about 3.5%; and/or a flexural modulus of from about 5,000 MPa o about 20,000 MPa, in some embodiments from about 8,000 MPa to about 20,000 MPa, and in some embodiments, from about 10,000 MPa to about 15,000 MPa. The flexural properties may be determined at a temperature of 23° C. in accordance with 178:2010.

Various embodiments of the present invention will now be described in more detail.

I. Polymer Composition

A. Liquid Crystalline Polymer

As indicated, the polymer composition contains one or more liquid crystalline polymers, generally in an amount of from about 40 wt. % to 100 wt. %, in some embodiments from about 50 wt. % to about 99 wt. %, and in some embodiments, from about 60 wt. % to about 95 wt. % of the entire polymer composition. Liquid crystalline polymers are generally classified as "thermotropic" to the extent that they can possess a rod-like structure and exhibit a crystalline behavior in their molten state (e.g., thermotropic nematic state). The liquid crystalline polymers employed in the polymer composition typically have a melting temperature within the ranges noted above. Such polymers may be formed from one or more types of repeating units as is known in the art. A liquid crystalline polymer may, for example, contain one or more aromatic ester repeating units generally represented by the following Formula (I):

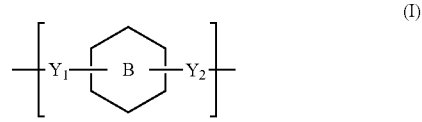

wherein, ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic hydroxycarboxylic repeating units, for instance, may be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute about 40 mol. % or more, in some embodiments about 50 mole % or more, in some embodiments from about 55 mol. % to 100 mol. %, and in some embodiments, from about 60 mol. % to about 95 mol. % of the polymer.

Aromatic dicarboxylic repeating units may also be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl) ether, bis(4-carboxyphenyl)butane, bis(4-carboxyphenyl) ethane, bis(3-carboxyphenyl)ether, bis(3-carboxyphenyl) ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 1 mol. % to about 40 mol. %, in some embodiments from about 2 mol. % to about 30 mol. %, and in some embodiments, from about 5 mol. % to about 25% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about about 1 mol. % to about 40 mol. %, in some embodiments from about 2 mol. % to about 30 mol. %, and in some embodiments, from about 5 mol. % to about 25% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although by no means required, the liquid crystalline polymer may be a "high naphthenic" polymer in certain embodiments to the extent that it contains a relatively high content of repeating units derived from naphthenic hydroxycarboxylic acids and naphthenic dicarboxylic acids, such as NDA, HNA, or combinations thereof. That is, the total amount of repeating units derived from naphthenic hydroxycarboxylic and/or dicarboxylic acids (e.g., NDA, HNA, or a combination of HNA and NDA) is typically about 40 mol. % or more, in some embodiments about 45 mol. % or more, in some embodiments about 50 mol. % or more, in some embodiments, in some embodiments about 55 mol. % or more, and in some embodiments, from about 60 mol. % to about 95 mol. % of the polymer. For instance, the repeating units derived from HNA may constitute from about 40 mol. % or more, in some embodiments about 50 mol. % or more, in some embodiments about 55 mol. % or more, and in some embodiments, from about 55 mol. % to about 85 mol. % of the polymer. In such embodiments, the liquid crystalline polymer may contain the naphthenic monomers (e.g., HNA and/or NDA) in the amounts specified above in combination with various other monomers, such as aromatic hydroxycarboxylic acid(s) (e.g., HBA) in an amount of from about 5 mol. % to about 50 mol. %, and in some embodiments, from about 10 mol. % to about 40 mol. %; aromatic dicarboxylic acid(s) (e.g., IA and/or TA) in an amount of from about 1 mol. % to about 40 mol. %, and in some embodiments, from about 5 mol. % to about 25 mol. %; and/or aromatic diol(s) (e.g., BP and/or HQ) in an amount of from about 1 mol. % to about 40 mol. %, and in some embodiments, from about 5 mol. % to about 25 mol. %.

Regardless of the particular constituents and nature of the polymer, the liquid crystalline polymer may be prepared by initially introducing the aromatic monomer(s) used to form the ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 200° C. to about 400° C., in some embodiments from about 210° C. to about 400° C., and in some embodiments, from about 250° C. to about 380° C. For instance, one suitable technique for forming the aromatic polyester may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to from about 200° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. In some embodiments, the melt polymerized polymer may also be subjected to a subsequent solid-state polymerization method to further increase its molecular weight. Solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of from about 250° C. to about 350° C. The polymerization time will of course vary based on the temperature and target molecular weight. In most cases, however, the solid-state polymerization time will be from about 2 to about 12 hours, and in some embodiments, from about 4 to about 10 hours.

B. Other Optional Components

A wide variety of additional additives can also be included in the polymer composition, such as fillers (e.g., fibers, particulate fillers, etc.), lubricants, impact modifiers, flow modifiers, pigments, antioxidants, stabilizers, surfactants, waxes, flame retardants, anti-drip additives, and other materials added to enhance properties and processability.

For instance, a filler may be employed for improving certain properties of the polymer composition. When employed, the filler may be employed in the polymer composition in an amount of from about 10 to about 95 parts, in some embodiments from about 20 to about 90 parts, and in some embodiments, from about 50 to about 85 parts by weight per 100 parts of the aromatic polymer(s) employed in the polymer composition. For instance, the filler may constitute from about 10 wt. % to about 70 wt. %, in some embodiments from about 20 wt. % to about 60 wt. %, and in some embodiments, from about 30 wt. % to about 60 wt. % of the polymer composition. The nature of the filler may vary, such as particles, fibers, etc. Fibrous fillers, for instance, may be employed to help improve strength. Examples of such fibrous fillers may include those formed from glass, carbon, ceramics (e.g., alumina or silica), aramids (e.g., Kevler® marketed by E.I. DuPont de Nemours, Wilmington, Del.), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof. Particulate fillers may also be employed. Clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite ($(K, H_3O)(Al, Mg, Fe)_2(Si,Al)_4O_{10}[(OH)_2,(H_2O)]$), montmorillonite ($(Na, Ca)_{0.33}(Al, Mg)_2Si_4O_{10}(OH)_2 \cdot nH_2O$), vermiculite (($(MgFe, Al)_3(Al,$ Si)$_4$O$_{10}$(OH)$_2$.4H$_2$O), palygorskite ((Mg, Al)$_2$Si$_4$O$_{10}$(OH).4 (H$_2$O)), pyrophyllite (Al$_2$Si$_4$O$_{10}$(OH)$_2$), etc., as well as combinations thereof. In lieu of, or in addition to, clay minerals, still other particulate fillers may also be employed. For example, other suitable silicate fillers may also be employed, such as calcium silicate, aluminum silicate, mica, diatomaceous earth, wollastonite, and so forth.

The liquid crystalline polymer and other optional additives may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. The extruder may be a single screw or twin screw extruder. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

II. Three-Dimensional Printing

As noted above, the unique properties of the polymer composition are particularly well-suited for forming structures by three-dimensional printing. Various types of three-dimensional printing techniques may be employed, such as extrusion-based systems (e.g., fused deposition modeling), powder bed fusion, electrophotography, etc. When employed in a fused deposition modeling system, for instance, the polymer composition may be employed as the build material that forms the three-dimensional structure and/or the support material that is removed from the three-dimensional structure after it is formed. Referring to FIG. 1, for example, one embodiment of an extrusion-based, three-dimensional printer system 10 is shown that may be employed to selectively form a precursor object containing a three-dimensional build structure 30 and a corresponding support structure 32. In the particular embodiment illustrated, the system includes a build chamber 12 and supply sources 22 and 24. As noted above, the polymer composition of the present invention may be used to form the build structure 30 and/or support structure 32. In those embodiments in which the polymer composition is only employed in the build structure or the support structure, it should be understood any other conventional material can be employed for the other structure. For example, in certain embodiments, the polymer composition of the present invention may be used to form the build structure 30. In such embodiments, suitable materials for the support structure 32 may include conventional materials that are soluble or at least partially soluble in water and/or an aqueous alkaline solution, which is suitable for removing support structure 32 in a convenient manner without damaging build structure 24. Examples of such materials may include those described in U.S. Pat. No. 6,070,107 to Lombardi et al., U.S. Pat. No. 6,228,923 to Lombardi et al., U.S. Pat. No. 6,790,403 to Priedeman et al., and U.S. Pat. No. 7,754,807 to Priedeman et al.

The material for the build structure 30 may be supplied to a nozzle 18 from the supply source 22 via a feed line 26 and the support material for the support structure 32 may be supplied to the nozzle 18 from supply source 24 via a feed line 28. The build chamber 12 likewise contains a substrate 14 and substrate frame 16. The substrate 14 is a platform on which the build structure 30 and support structure 32 are built. The substrate is supported by a substrate frame 16, which is configured to move the substrate 14 along (or substantially along) a vertical z-axis. Likewise, the nozzle 18 is supported by a head frame 20, which is configured to move the nozzle 18 in (or substantially in) a horizontal x-y plane above chamber 12. The nozzle 18 is configured for printing the build structure 30 and the support structure 32 on the substrate 14 in a layer-by-layer manner, based on signals provided from the controller 34. In the embodiment shown in FIG. 1, for example, the nozzle 18 is a dual-tip extrusion nozzle configured to deposit build and support materials from the supply source 22 and the supply source 24, respectively. Examples of such extrusion nozzles are described in more detail in U.S. Pat. No. 5,503,785 to Crump, et al.; U.S. Pat. No. 6,004,124 to Swanson, et al.; U.S. Pat. No. 7,604,470 to LaBossiere, et al., and U.S. Pat. No. 7,625,200 to Leavitt. The system 10 may also include other print nozzles for depositing build and/or support materials from one or more tips. During a print operation, the frame 16 moves the nozzle 18 in the horizontal x-y plane within the build chamber 12, and drive mechanisms are directed to intermittently feed the build and support materials from supply sources 22 and 24. In alternative embodiments, the nozzle 18 may function as a screw pump, such as described in U.S. Pat. No. 5,764,521 to Batchelder, et al. and U.S. Pat. No. 7,891,964 to Skubic, et al.

The system 10 may also include a controller 34, which may include one or more control circuits configured to monitor and operate the components of the system 10. For example, one or more of the control functions performed by controller 34 can be implemented in hardware, software, firmware, and the like, or a combination thereof. The controller 34 may communicate over communication line 36 with chamber 12 (e.g., with a heating unit for chamber 12), the nozzle 18, and various sensors, calibration devices, display devices, and/or user input devices. The system 12 and/or controller 34 may also communicate with a computer 38, which is one or more computer-based systems that communicates with the system 12 and/or controller 34, and may be separate from system 12, or alternatively may be an internal component of system 12. The computer 38 includes computer-based hardware, such as data storage devices, processors, memory modules, and the like for generating and storing tool path and related printing instructions. The computer 38 may transmit these instructions to the system 10 (e.g., to controller 34) to perform printing operations so that the three-dimensional structure are selectively formed.

Figure 2:
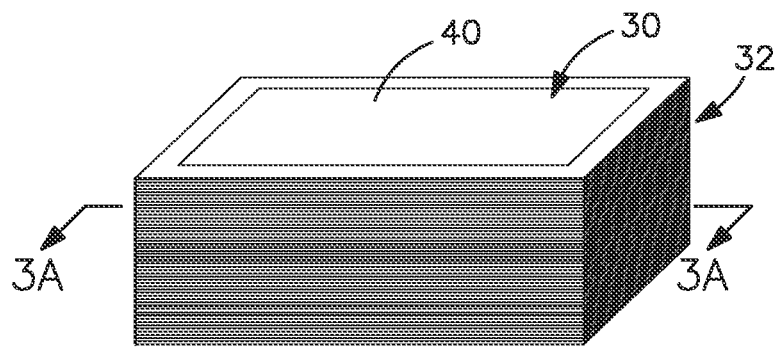
FIG. 2 is a perspective view of one embodiment of a three-dimensional structure that may be formed from the polymer composition of the present invention.
Figure 3A:
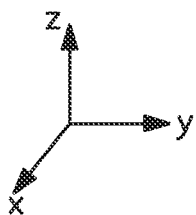
FIGS. 3A-3C are cross-sectional views of FIG. 2 taken along a line 3A-3A, depicting a process for forming a three-dimensional structure.
Figure 3A:
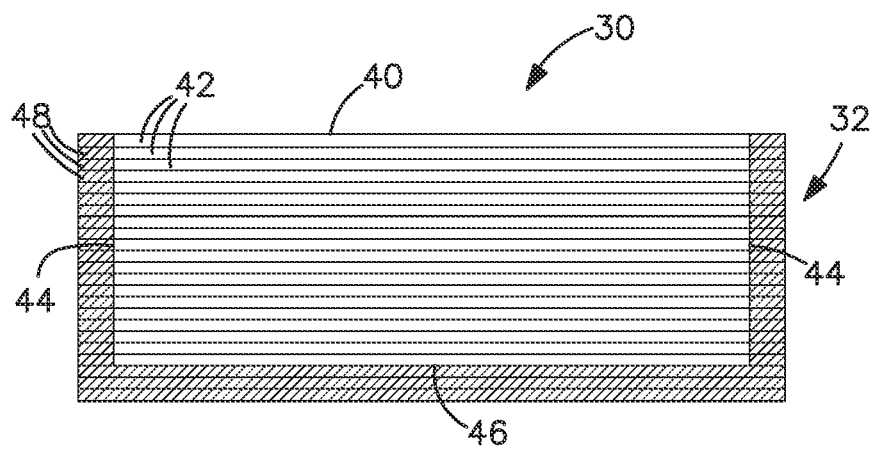

As shown in FIG. 2, the build structure 30 may be printed onto the substrate 14 as a series of successive layers of the build material, and the support structure 32 may likewise be printed as a series of successive layers in coordination with the printing of the build structure 30. In the illustrated embodiment, the build structure 30 is shown as a simple block-shaped object having a top surface 40, four lateral surfaces 44 (FIG. 3A), and a bottom surface 46 (FIG. 3A). Although by no means required, the support structure 32 in this embodiment is deposited to at least partially encapsulate the layers of build structure 30. For example, the support structure 32 may be printed to encapsulate the lateral surfaces and the bottom surface of build structure 30. Of course, in alternative embodiments, the system 10 may print three-dimensional objects having a variety of different geometries. In such embodiments, the system 10 may also print corresponding support structures, which optionally, at least partially encapsulate the three-dimensional objects.

Figure 3B:
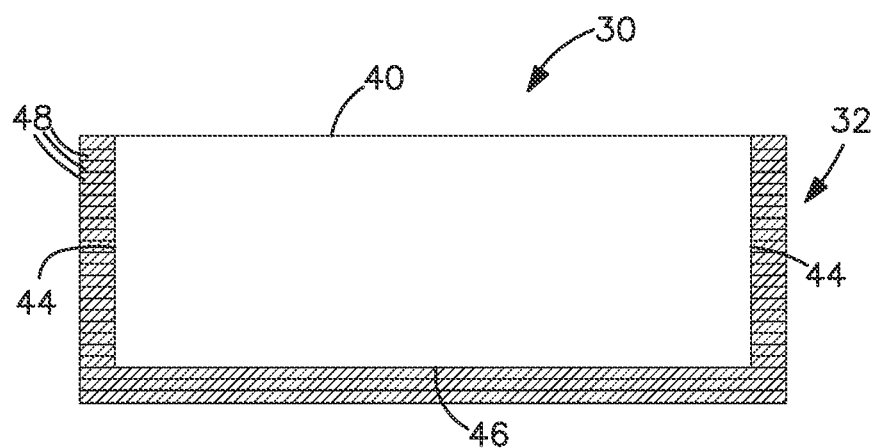
Figure 3C:
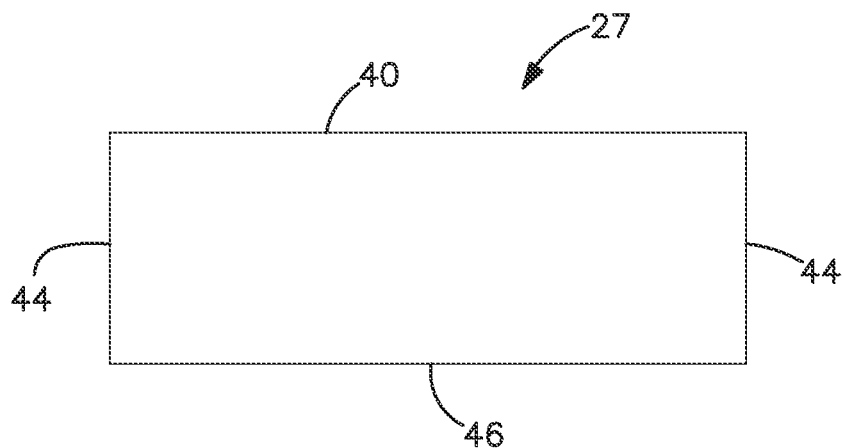

FIGS. 3A-3C illustrate the process of for printing the three-dimensional build structure 24 and support structure 32 in the manner described above. As shown in FIG. 3A, each layer of the build structure 30 is printed in a series of layers 42 to define the geometry of the build structure 30. In this embodiment, each layer of the support structure 32 is printed in a series of layers 48 in coordination with the printing of layers 42 of the three-dimensional build structure 30, where the printed layers 48 of the support structure 32 encapsulate the lateral surfaces 44 and the bottom surface 46 of the build structure 30. In the illustrated embodiment, the top surface 40 is not encapsulated by the layers 48 of the support structure 32. After the print operation is complete, the support structure 32 may be removed from the build structure 30 to create a three-dimensional object 27. For example, in embodiments in which the support material is at least partially soluble in water or an aqueous alkaline solution, the resulting object may be immersed in water and/or an aqueous alkaline solution bath to dissolve the support structure 32.

The polymer composition may be supplied to the three-dimensional printer in a variety of different forms, such as in the form of a sheet, film, fiber, filament, pellet, powder, etc. In one particular embodiment, such as when a fused deposition modeling technique is employed, the polymer composition may be supplied in the form of a filament as described in U.S. Pat. No. 6,923,634 to Swanson, et al. and U.S. Pat. No. 7,122,246 to Comb, et al. The filament may, for example, have an average diameter of from about 0.1 to about 20 millimeters, in some embodiments from about 0.5 to about 10 millimeters, and in some embodiments, from about 1 to about 5 millimeters. The filament may be included within a printer cartridge that is readily adapted for incorporation into the printer system. The printer cartridge may, for example, contains a spool or other similar device that carries the filament. For example, the spool may have a generally cylindrical rim about which the filament is wound. The spool may likewise define a bore or spindle that allows it to be readily mounted to the printer during use.

Figure 4:
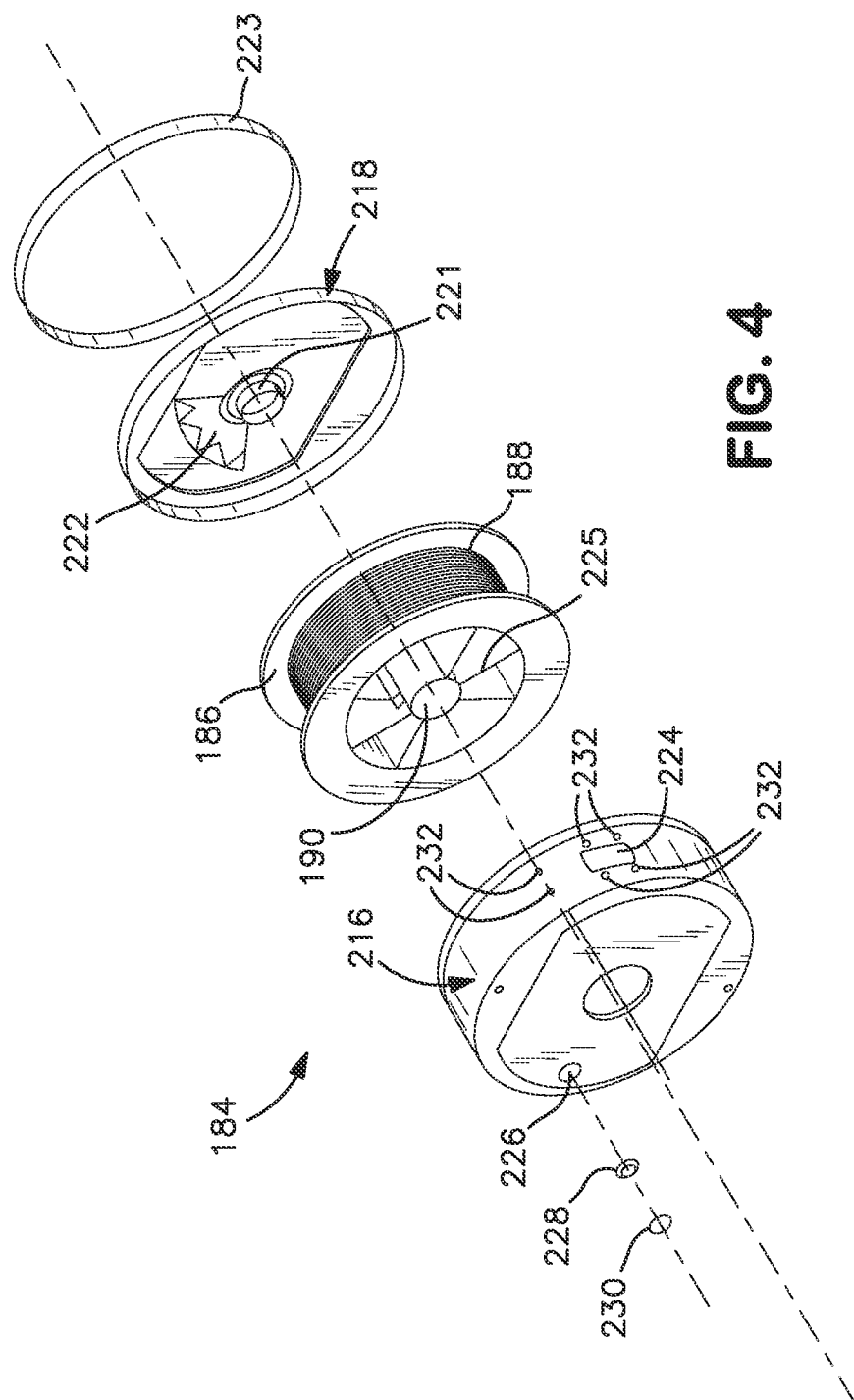
FIG. 4 is an exploded perspective view of one embodiment of a printer cartridge that may be employed in the present invention.

Referring to FIG. 4, for example, one embodiment of a spool 186 is shown that contains an outer rim about which a filament 188 is wound. A generally cylindrical bore 190 is also defined within a central region of the spool 186 about which multiple spokes 225 are axially positioned. Although not required, the printer cartridge may also contain a housing structure that encloses the spool and thus protects the filaments from the exterior environment prior to use. In FIG. 4, for instance, one embodiment of such a cartridge 184 is shown that contains a canister body 216 and a lid 218 that are mated together to define an interior chamber for enclosing the spool 186. In this embodiment, the lid 218 contains a first spindle 227 and the canister body 216 contains a second spindle (not shown). The spool 186 may be positioned so that the spindles of the canister body and/or lid are positioned within the bore 190. Among other things, this can allow the spool 186 to rotate during use. A spring plate 222 may also be attached to the inside of the lid 218 that has spiked fingers, which are bent to further enhance rotation of the spool 186 in only the direction that will advance filament out of the cartridge 184. Although not shown, a guide block may be attached to the canister body 216 at an outlet 224 to provide an exit path for the filament 188 to the printer system. The guide block may be fastened to the canister body 216 by a set of screws (not shown) that can extend through holes 232. If desired, the cartridge 184 may be sealed prior to use to help minimize the presence of moisture. For example, a moisture-impermeable material 223 (e.g., tape) may be employed to help seal the lid 218 to the canister body 216. Moisture can be withdrawn from the interior chamber of the canister body 216 through a hole 226, which can thereafter be sealed with a plug 228. A moisture-impermeable material 230 may also be positioned over the plug 228 to further seal the hole 226. Before sealing the cartridge 184, it may be dried to achieve the desired moisture content. For example, the cartridge 184 may be dried in an oven under vacuum conditions. Likewise, a desiccant material may also be placed within the cartridge 184, such as within compartments defined by the spokes 225 of the spool 186. Once fully assembled, the cartridge 184 may optionally be sealed within a moisture-impermeable package.

In addition to being supplied in the form of a filament, the polymer composition may also be supplied to the fused deposition modeling system of FIG. 1 in other forms. In one embodiment, for instance, the polymer composition may be supplied in the form of pellets. For instance, the pellets may be supplied via a hopper (not shown) to a viscosity pump (not shown) that deposits the polymer composition onto the substrate 14. Such techniques are described, for instance, in U.S. Pat. No. 8,955,558 to Bosveld, et al., which is incorporated herein by reference. The viscosity pump may be an auger-based pump or extruder configured to shear and drive successive portions of received pellets and may be supported by a head frame 20 that can move the viscosity pump and/or hopper in the horizontal x-y plane.

Of course, the three-dimensional printing system is by no means limited to fused deposition modeling. For instance, a powder bed fusion system may likewise be employed in certain embodiments of the present invention. In such embodiments, the polymer composition is generally provided in the form of a powder containing a plurality of particles. The size of the particles may be selectively controlled to help facilitate three-dimensional printing. The volume-based median particle size may, for example, range from about 0.5 to about 200 micrometers, in some embodiments from about 1 to about 100 micrometers, and in some embodiments, from about 2 to about 80 micrometers. The particle size distribution may be relatively narrow such that at least 90% by volume of the microparticles have a size within the ranges noted above. Further, the particles may also be generally spherical to help improve processability. Such particles may, for example, have an aspect ratio (ratio of length to diameter) of from about 0.7 to about 1.3, in some embodiments from about 0.8 to about 1.2, and in some embodiments, from about 0.9 to about 1.1 (e.g., about 1).

Figure 5:
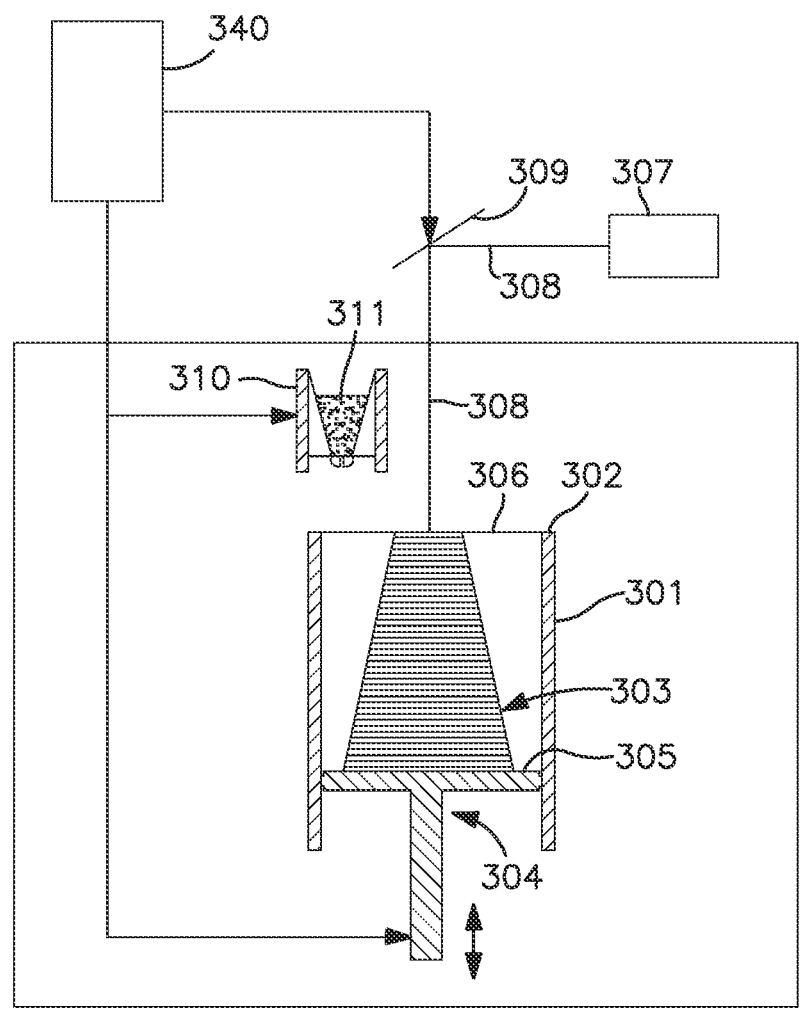
FIG. 5 is a schematic view of one embodiment of a powder bed fusion system that may be employed in the present invention.

Generally speaking, powder bed fusion involves selectively fusing the powder within a powder bed to form the three-dimensional structure. The fusion process may be initiated by an energy source, such as a laser beam (e.g., laser sintering), electron beam, acoustic energy, thermal energy, etc. Examples of such systems are described, for instance, in U.S. Pat. Nos. 4,863,538; 5,132,143; 5,204,055; 8,221,858; and 9,895,842. Referring to FIG. 5, for example, one embodiment of a lasering sintering system is shown. As shown, the system includes a powder bed 301 for forming a three-dimensional structure 303. More particularly, the powder bed 301 has a substrate 305 from which extends sidewalls 302 that together define an opening. During operation, a powder supply 311 is deposited on the substrate 305 in a plurality of layers to form a build material. A frame 304 is moveable in a vertical direction (e.g., parallel to the sidewall of the powder bed 301) to position the substrate 305 in the desired location. A printer head 310 is also provided to deposit the powder supply 311 onto the substrate 305. The printer head 310 and powder bed 301 may both be provided within a machine frame 301. After the powder supply is deposited, an irradiation device 307 (e.g., laser) emits a light beam 308 onto a work plane 306. This light beam 308 is directed as deflected beam 308' towards the work plane 306 by a deflection device 309, such as a rotating mirror. Thus, the powder supply 311 may be deposited layer-by-layer onto the working surface 305 or a previously fused layer, and thereafter fused at the positions of each powder layer corresponding by the laser beam 8'. After each selective fusion of a layer, the frame 304 may be lowered by a distance corresponding to the thickness of the powder layer to be subsequently applied. If desired, a control system 340 may also be employed to control the formation of the three-dimensional structure on the working surface 305. The control system 305 may include a distributed control system or any computer-based workstation that is fully or partially automated. For example, the control system 340 may be any device employing a general-purpose computer or an application-specific device, which may generally include processing devices (e.g., microprocessor), memory (e.g., CAD designs), and/or memory circuitry for storing one or more instructions for controlling operation of the printer head 310, powder bed 301, frame 304, and/or deflection device 309.

The following test methods may be employed to determine certain of the properties described herein.

Test Methods

Melt Viscosity: The melt viscosity (Pa-s) may be determined in accordance with ISO Test No. 11443:2005 at a shear rate of 1000 s$^{-1}$ and temperature 15° C. above the melting temperature (e.g., 350° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm+0.005 mm and the length of the rod was 233.4 mm.

Complex Viscosity: Complex viscosity is a frequency-dependent viscosity, determined during forced harmonic oscillation of shear stress at angular frequencies of 0.1 to 500 radians per second. Prior to testing, the sample is cut into the shape of a circle (diameter of 25 mm) using a hole-punch. Measurements are determined at a temperature 15° C. above the melting temperature (e.g., 350° C. or 375° C.) and at a constant strain amplitude of 1% using an ARES-G2 rheometer (TA Instruments) with a parallel plate configuration (25 mm plate diameter). The gap distance for each sample is adjusted according to the thickness of each sample.

Melt Elongation: Melt elongation properties (i.e., stress, strain, and elongational viscosity) may be determined in accordance with the ARES-EVF: Option for Measuring Extensional Velocity of Polymer Melts, A. Franck, which is incorporated herein by reference. In this test, an extensional viscosity fixture ("EVF") is used on a rotational rheometer to allow the measurement of the engineering stress at a certain percent strain. More particularly, a thin rectangular polymer melt sample is adhered to two parallel cylinders: one cylinder rotates to wind up the polymer melt and lead to continuous uniaxial deformation in the sample, and the other cylinder measures the stress from the sample. An exponential increase in the sample length occurs with a rotating cylinder. Therefore, the Hencky strain ($\varepsilon_H$) is determined as function of time by the following equation: $\varepsilon_H(t)=\ln(L(t)/L_o)$, where $L_o$ is the initial gauge length of and L(t) is the gauge length as a function of time. The Hencky strain is also referred to as percent strain. Likewise, the elongational viscosity is determined by dividing the normal stress (kPa) by the elongation rate (s$^{-1}$). Specimens tested according to this procedure have a width of 1.27 mm, length of 30 mm, and thickness of 0.8 mm. The test may be conducted at the melting temperature (e.g., about 360° C.) and elongation rate of 2 s$^{-1}$.

Melting Temperature: The melting temperature ("Tm") may be determined by differential scanning calorimetry ("DSC") as is known in the art. The melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation: Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus and Flexural Stress: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A three-dimensional printing method comprising selectively forming a three-dimensional structure from a polymer composition, wherein the polymer composition comprises a thermotropic liquid crystalline polymer and exhibits a complex viscosity of from about 50 to about 1,000 Pa-s, as determined by a parallel plate rheometer at an angular frequency of 0.63 radians per second, constant strain amplitude of 1%, and temperature 15° C. above the melting temperature of the polymer composition, wherein the polymer composition exhibits a melting temperature of from about 200° C. to about 290° C.

2. The method of claim 1, wherein the polymer composition exhibits a maximum engineering stress of about 200 kPa or more, as determined at the melting temperature of the polymer composition with an extensional viscosity fixture and a rotational rheometer.

3. The method of claim 1, wherein the polymer composition exhibits a melt viscosity of about 250 Pa-s or less, as determined in accordance with ISO Test No. 11443:2005 at a shear rate of 1,000 $s^{-1}$ and temperature 15° C. above the melting temperature of the polymer composition.

4. The method of claim 1, wherein the thermotropic liquid crystalline polymer contains aromatic ester repeating units, wherein the aromatic ester repeating units include aromatic dicarboxylic acid repeating units, aromatic hydroxycarboxylic acid repeating units, and aromatic diol repeating units.

5. The method of claim 4, wherein the aromatic hydroxycarboxylic acid repeating units are derived from 4-hydroxybenzoic acid, 6-hydroxy-2-naphthoic acid, or a combination thereof.

6. The method of claim 4, wherein the aromatic dicarboxylic acid repeating units are derived from terephthalic acid, isophthalic acid, or a combination thereof.

7. The method of claim 4, wherein the aromatic diol repeating units are derived from hydroquinone, 4,4'-biphenol, or a combination thereof.

8. The method of claim 1, wherein the thermotropic liquid crystalline polymer has a total amount of repeating units derived from naphthenic hydroxycarboxylic and/or naphthenic dicarboxylic acids of about 10 mol. % or more.

9. The method of claim 1, wherein the polymer composition is selectively extruded through a nozzle to form the three-dimensional structure.

10. The method of claim 9, wherein the polymer composition is in the form of a filament.

11. The method of claim 9, wherein the polymer composition is in the form of a pellet.

12. The method of claim 1, wherein the polymer composition is selectively fused to form the three-dimensional structure.

13. The method of claim 12, wherein the polymer composition is in the form of a powder.

14. The method of claim 13, wherein the polymer composition is selectively fused using thermal energy, a laser beam, electron beam, acoustic energy, or a combination thereof.

15. The method of claim 1, wherein the polymer composition exhibits a melting temperature of from about 250° C. to about 290° C.

16. A printer cartridge for use in a three-dimensional printing system, the printer cartridge comprising a filament that is formed from a polymer composition, wherein the polymer composition comprises a thermotropic liquid crystalline polymer and exhibits a complex viscosity of from about 50 to about 1,000 Pa-s, as determined by a parallel plate rheometer at an angular frequency of 0.63 radians per second, constant strain amplitude of 1%, and temperature at 15° C. above a melting temperature of the polymer composition, wherein the polymer composition exhibits a melting temperature of from about 200° C. to about 290° C.

17. The printer cartridge of claim 16, wherein the filament is wound around a rim of a spool.

18. A three-dimensional printing system comprising:
a supply source containing a polymer composition, wherein the polymer composition comprises a thermotropic liquid crystalline polymer and exhibits a complex viscosity of from about 50 to about 1,000 Pa-s, as determined by a parallel plate rheometer at an angular frequency of 0.63 radians per second, constant strain amplitude of 1%, and temperature at 15° C. above a melting temperature of the polymer composition, wherein the polymer composition exhibits a melting temperature of from about 200° C. to about 290° C.; and
a nozzle that is configured to receive the polymer composition from the supply source and deposit the composition onto a substrate.

19. The system of claim 18, wherein the supply source is a printer cartridge containing a filament, wherein the filament comprises the polymer composition.

20. The system of claim 18, wherein the supply source is a hopper containing pellets, wherein the pellets comprise the polymer composition.

21. The system of claim 20, further comprising a viscosity pump that contains the nozzle, wherein the viscosity pump is configured to receive the pellets from the hopper and extrude the pellets through the nozzle onto the substrate.

22. A three-dimensional printing system comprising:
a powder supply comprising a plurality of particles formed from a polymer composition, wherein the polymer composition comprises a thermotropic liquid crystalline polymer and exhibits a complex viscosity of from about 50 to about 1,000 Pa-s, as determined by a parallel plate rheometer at an angular frequency of 0.63 radians per second, constant strain amplitude of 1%, and temperature at 15° C. above a melting temperature of the polymer composition, wherein the polymer composition exhibits a melting temperature of from about 200° C. to about 290° C.;
a powder bed configured to receive the powder supply; and
an energy source for selectively fusing the powder supply when present within the powder bed.

23. The system of claim 22, wherein the particles have a volume-based median particle size of from about 0.5 to about 200 micrometers.

* * * * *